(12) United States Patent
Bau, III

(10) Patent No.: US 7,043,722 B2
(45) Date of Patent: May 9, 2006

(54) MIXED LANGUAGE EXPRESSION LOADING AND EXECUTION METHODS AND APPARATUSES

(75) Inventor: David Bau, III, Gladwyne, PA (US)

(73) Assignee: BEA Systems, Inc., San Jose, CA (US)

( * ) Notice: Subject to any disclaimer, the term of this patent is extended or adjusted under 35 U.S.C. 154(b) by 615 days.

(21) Appl. No.: 10/209,809

(22) Filed: Jul. 31, 2002

(65) Prior Publication Data

US 2004/0025147 A1 Feb. 5, 2004

(51) Int. Cl.
*G06F 9/45* (2006.01)

(52) U.S. Cl. .................................... 717/151

(58) Field of Classification Search ........ 717/114–151; 706/48; 345/760; 719/319
See application file for complete search history.

(56) References Cited

U.S. PATENT DOCUMENTS

| 4,783,752 A * | 11/1988 | Kaplan et al. ................ 706/48 |
| 5,410,696 A * | 4/1995 | Seki et al. ................... 717/149 |
| 6,126,328 A * | 10/2000 | Mallory et al. ............. 717/114 |
| 6,851,108 B1 * | 2/2005 | Syme et al. ................. 717/146 |
| 2002/0097268 A1 * | 7/2002 | Dunn et al. ................. 345/760 |
| 2004/0216094 A1 * | 10/2004 | Bosworth et al. ........... 717/141 |

* cited by examiner

*Primary Examiner*—Kakali Chaki
*Assistant Examiner*—Mark P. Francis
(74) *Attorney, Agent, or Firm*—Schwabe, Williamson & Wyatt, P.C.

(57) ABSTRACT

A mixed language expression execution method and apparatus includes an execution engine equipped to determine whether an execution context has previously been created for an expression, upon receiving a request to execute the expression. If not, one is created, invoking one or more expression processors, to contribute to the initialization of the execution context. If created or upon creation, the expression (including its sub-expressions, if any) is executed, using the execution context. The result is then returned to the requester. In one embodiment, the execution context is object oriented, and includes various methods to facilitate the initialization and execution. Further, at least one expression processor includes a load and an execute interface equipped to use these methods.

83 Claims, 8 Drawing Sheets

| Load related Methods ~ 144 | Execute related Methods ~ 146 |
|---|---|
| Put Value of Expression Scope Variable ~ 602 | Put Value of Expression Scope Variable ~ 640 |
| Get Value of Expression Scope Variable ~ 604 | Get Value of Expression Scope Variable ~ 642 |
| Put Value of Request Scope Variable ~ 608 | Put Value of Request Scope Variable ~ 644 |
| Get Value of Request Scope Variable ~ 610 | Get Value of Request Scope Variable ~ 646 |
| Declare Local Variables Defined ~ 612 | Declare Local Variables Defined ~ 648 |
| Declare Beginning of New Stack Frame ~ 614 | Create New Stack Frame ~ 650 |
| Declare End of Current Stack Frame ~ 616 | Destroy Current Stack Frame ~ 652 |
| Declare Local Variables Used ~ 618 | Put Value of Local Variable ~ 654 |
| Get Local Variables Used by Others ~ 620 | Get Value of Local Variable ~ 656 |
| Load Sub-Expression ~ 630 | Execute Sub-Expression ~ 660 |

Figure 5

MIXED LANGUAGE EXPRESSION LOADING AND EXECUTION METHODS AND APPARATUSES

BACKGROUND OF THE INVENTION

1. Field of the Invention

The present invention relates to the field of data processing. More specifically, the present invention relates to the processing of mixed language expressions, including the employment of expression execution context, and expression processors, in particular, those with load and execute interfaces.

2. Background Information

Ever since the invention of the first computer, computer scientists have continuously tried to improve the productivity of programmers, such that more applications can be developed using fewer resources to take advantage of the continuous advancements being made in the art of computer and related technologies. First assembler languages were developed to replace machine languages. Then, high-level languages, such as FORTRAN, COBOL, PL/I and so forth, were developed to further improve the productivity of programmers. Development of high-level languages were followed by structured languages such as Pascal and C, and then object oriented programming languages such as C++. To facilitate development of the Internet and the World Wide Web, "new" languages such as the Hypertext Markup Language (HTML), Java, Javascript, Perl and CGI were developed.

Most implementations of programming languages include runtime support facilities, such as memory allocation and de-allocation, exception handling, library functions, and so forth.

Each programming language has its strength and weakness. Some are more suitable for certain applications over others. It is often desirable to be able to represent data processing operations in executable expressions, employing instructions or statements of different programming languages to solve a problem or implement an application. However, few programming languages offer native supports of inter-mixing expressions employing instructions of different languages or inter-mixing languages in an expression. To the extent that mixed language execution is supported, the approach is often proprietary and not extendable to other programming languages.

With the advance of the Internet, Web services, and so forth, increasingly application developers are required to develop applications richer in functions, more complex in the environments they execute, at a faster rate and lower cost.

For at least some of these reasons, an improved approach to processing expressions, especially, one that is extensible to include expressions of different languages as well as mixed language expressions, is desired.

BRIEF DESCRIPTION OF DRAWINGS

The present invention will be described by way of exemplary embodiments, but not limitations, illustrated in the accompanying drawings in which like references denote similar elements, and in which:

FIG. 5 illustrates the various methods associated with an implementation of the expression execution context, in accordance with one embodiment.

DETAILED DESCRIPTION OF THE INVENTION

Figure 1:
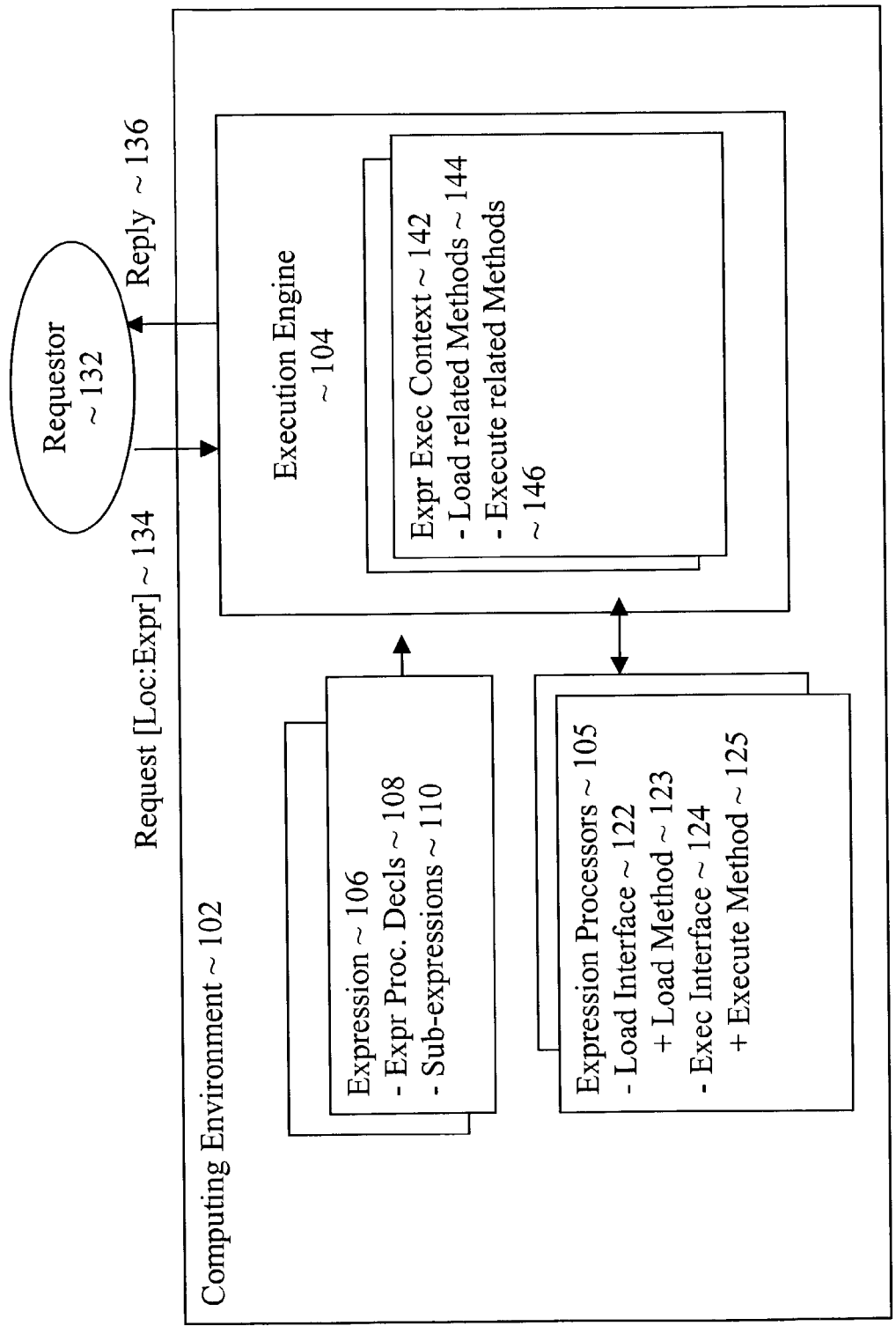
FIG. 1 illustrates an overview of the expression execution method of the present invention, including expression execution context and expression processors with load and execute interfaces of the present invention, in accordance with one embodiment.

The present invention includes an execution method for expressions including the employment of execution contexts to facilitate their loading and execution by one or more expression processors, and interfaces for interfacing with the expression processors.

In the following description, various aspects of the present invention will be described. However, the present invention may be practiced with only some or all aspects of the present invention. For purposes of explanation, specific numbers, materials and configurations are set forth in order to provide a thorough understanding of the present invention. However, the present invention may be practiced without the specific details. In other instances, well-known features are omitted or simplified in order not to obscure the present invention.

Parts of the description will be presented in data processing terms, such as data, variables, methods, request, return, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical, electrical and/or optical components of a computer system.

Glossary

The term "expression" as used herein refers to a collection of literal values, identifiers and/or operators having predefined syntaxes and semantics. Evaluating an expression within a given context results in a value (potentially empty) and zero or more side-effects (e.g., store a value, send a message, collect input, etc.) defined by the semantics of the expression language. Each operator may have one or more operands, which are also expressions (called sub-expressions). The semantics of the operators determine if, when, and how many times each operand (i.e., sub-expression) is evaluated.

An "expression processor" is an application, a collection of modules and/or routines, or a single module or routine, that is equipped to process, e.g. load and/or execute an expression. Execution of an expression includes computing its value and carrying out the side effects defined by the semantics of the expression language implemented by the expression processor. An "expression processor" may be equipped to process expressions using language elements of a subset or the entire set of one or more expression languages.

The term "computer system" as used herein includes general purpose as well as special purpose data processing machines, systems, and the like, that are standalone, adjunct or embedded.

Section Headings, Order of Descriptions and Embodiments

Section headings are merely employed to improve readability, and they are not to be construed to restrict or narrow the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may.

Overview

We refer now to FIG. 1, wherein a block diagram illustrates an overview of the expression execution method of the present invention, including the expression execution context, and expression processors incorporated with the teachings of the present invention, in accordance with one embodiment. As illustrated, in accordance with the present invention, a computing environment 102 is provided with execution engine 104, supplemented with one or more expression processors 105, both incorporated with the teachings of the present invention, to facilitate execution of expressions 106 expressed with language elements of one or more expression languages.

As defined in the glossary section, each expression 106 may include one or more sub-expressions 110, each of which in turn may further include one or more other sub-expressions. As illustrated, for the embodiment, an expression 106 includes in particular one or more expression processor declarations 108 identifying the expression processor(s) 105 to be employed to process the expression 106 (including the sub-expressions, if any). In one embodiment, expression processor declarations take the form of namespace declarations, which use URIs to uniquely identify specific expression processors (e.g., by association with specific expression languages). In other embodiments, the invention may be practiced with other non-namespace means for declaring the identity of the expression processors 105.

In accordance with the present invention, corresponding expression execution contexts 142 are employed to facilitate execution of expressions 106. As will be appreciated from the descriptions to follow, expression execution contexts 142 are designed to facilitate multiple concurrent expressions and execution requests of the corresponding expressions 106. Moreover, within each request to execute an expression 106, the expression may be recursively invoked multiple times.

In one embodiment, execution contexts 142 are implemented in an object-oriented manner, with each execution context object 142 having a number of associated methods (pre-provided). Some 144 are designed for use by expression processors 105 during loading of expressions 106, while others 146, are designed for use by expression processors 105 during execution of expressions 106.

Execution engine 104 is endowed with logic to determine the appropriate expression processor 105 for a given expression, invoke the expression processor 105 through common, well-defined load and execute interfaces 122 and 124, and return the result of the expression to the caller. This logic may be invoked in response to an external request 134 or by one or more expression processor 105 (recursively) to evaluate a sub-expression. As will be described in more detail below, in one embodiment, this logic of execution engine 104 includes a load expression function (not shown) and an execute expression function (not shown). Further, load and execution interfaces 122 and 124 are designed to facilitate efficient invocation of processors 105 to contribute to the loading and execution of expressions 106, using expression execution contexts 142 of the present invention. For the illustrated embodiment, load interface 122 includes a load method 123 to be invoked to contribute to the creation of an execution context object 142 for an expression 106, and execute interface 124 includes an execute method 125 to be invoked to contribute to the execution of the expression 106, using the corresponding execution context object 142.

As will be described in more detail below, upon receiving request 134 from a requestor 132 (e.g. a remote client on the Internet) to execute an expression 106 (e.g. a web service), execution engine 104 (e.g. disposed on a web server) first determines whether the expression 106 has been loaded and the corresponding execution context 142 has previously been created. If expression 106 has not been loaded and the corresponding execution context 142 has not been previously created, execution engine 104 cooperates with the appropriate expression processors 105 to load expression 106 causing an execution context 142 to be created and initialized. Execution engine 104 first locates and retrieves the requested expression 106. In one embodiment, an expression 106 is located based on the location information included as part of the request.

Upon retrieving the requested expression 106, execution engine 104 and expression processors 105 cooperate using execution context 142 and well defined load interface 122 to cause the appropriate ones of expression processors 105 to be invoked, to contribute to the loading of expression 106 and the creation of the associated execution context 142. In one embodiment, the appropriate expression processors 105 to invoke are determined based on the expression processor declarations within the expression 106.

Upon determining execution context 142 has previously been created, or upon creating the execution context 142, execution engine 104 and expression processors 105 again cooperate using execution context 142 and well defined execute interface 124 to cause the appropriate ones of expression processors 105 to be invoked, to contribute to the execution of expression 106. Similarly, the appropriate expression processors 105 to be invoked, are determined based on the expression processor declarations within the expression 106.

When expression processor 105 encounters a sub-expression (known or unknown, i.e., of the same or of a foreign language) during loading or execution, it "delegates" the processing of sub-expression to the execution engine 104, by invoking the execution engine's 104 load or execute logic, which recursively invokes one or more appropriate expression processors 105 to process the sub-expression. At each (recursive) invocation, the execution engine 104, determines the appropriate next expression processor 105 to be invoked to process the sub-expression, and transfers execution control accordingly. Once the processing of each invocation is completed, the processing result and execution control is returned to the caller. Accordingly, the processing results and execution control are successively returned to the callers in the reverse order of the recursive invocations. Eventually, the processing results and execution control are returned to the execution engine 104, which in turn, returns the result to the "first" expression processor that initiated the recursive invocations. The first processor 105 then continues its processing, using the result returned by execution engine 104. Note that the "first" expression processor needs not know anything about any of the subsequent expression processors recursively invoked, and vice versa. Each expression processor needs only know how to accept and delegate expression evaluation requests to and from execution engine 104.

Intermediate results may be shared or made accessible to the expression processors 105, through the corresponding execution context 142. As will be also readily apparent from the descriptions to follow, the execution results between different invocations of the expression 106 within a request 134, as well as between different requests 134 of execution of the expression 106 are properly segregated.

After an entire expression 106 has been processed and the result returned to execution engine 104, execution engine 104 returns the final execution result, if any, to the requestor. If "side-effects" are to result from the execution, they are carried out by expression processors 105 in the course of execution.

As illustrated and alluded to earlier, for the embodiment, at least some of the expression processors 105 are equipped with load and execution interfaces 122 and 124 for invoking the processors 105 to contribute to the loading and execution of an expression 106. As described earlier, for the embodiment, load interface 122 includes a load method 123 to be invoked to initialize at least a portion of an execution context object 142 for an expression 106, and execute interface 124 includes an execute method 125 to be invoked to execute at least a portion of an expression 106, using the corresponding execution context object 142.

In general, except for execution contexts 142, and the teachings of the present invention incorporated in execution engine 104 and expression processors 105, and the exploitation of these abilities by expressions 106 and requesters 132, expressions 106 are otherwise intended to represent a broad range of expression methodologies known in the art, and execution engine 104 as well as requestor 132 are all intended to represent a broad range of the corresponding engines/clients known in the art. Further, computing environment 102 may be disposed in a single or multi-processor system, or a collection of networked systems. In the case of networked systems, the systems may be networked locally, or across one or more private and/or public networks, including the Internet.

For the purpose of the application, a "request to execute an expression", is also an implicit "request to load the expression (for execution)", if the expression has not been previously loaded. In alternate embodiments, explicit load request may also be supported.

Expressions

Still referring to FIG. 1, as described earlier, for the embodiment, each expression 106 includes one or more expression processor declarations 108 declaring one or more expression processors employed. In one embodiment, declarations 108 are expressed as namespaces in accordance with the following exemplary syntax:
<xs:xsheet xmlns:xs="xl://crossgain.net/lang/xsheet/"
  xmlns:java="xl://crossgain.net/lang/java/">
where "xmlns" declares an XML namespace, "xl://crossgain.net/lang/xsheet/" is a namespace identifier using a specially formed URI identifying one language that may be used in this expression. For the embodiment, execution engine 104 uses this URI to identify an appropriate expression processor 105 for expressions 106 written in this language.

"xl://crossgain.net/lang/java/" is a specially formed URI identifying a second expression language that may be used in this source (an extension of the well known Java language in this example). Similarly, execution engine 104 uses this URI to identify an appropriate expression processor 105 for expressions 106 written in this language.

"xs" is a namespace prefix used to identify expressions written in the language identified by the associated namespace,
"xl://crossgain.net/lang/xsheet/"

"java" is a namespace prefix used to identify expressions written in the language identified by the associated namespace,
"xl://crossgain.net/lang/java/"

The exemplary Xsheet expression "language" is a cell based data processing methodology including various "language" elements. Cell based data processing is described in U.S. patent application Ser. No. 09/741,219, entitled "Cell Based Data Processing", filed on Dec. 19, 2000, which is a non-provisional application of the U.S. provisional patent application No. 60/246,915. Readers are referred to the '219 application for further details.

For ease of understanding, the remaining description of the present invention will be presented primarily in the context of the aforementioned "cell based" methodology/language and the extension of the Java language. However, the present invention is not so limited. The present invention may be practiced with any two or more currently known or to be developed languages, as long as each of the languages is amenable to the declaration and reference techniques, employment of execution contexts 142, and/or adoption of the load and execute interfaces 122 and 124, all described in further details below.

Execution Context

Figure 4:
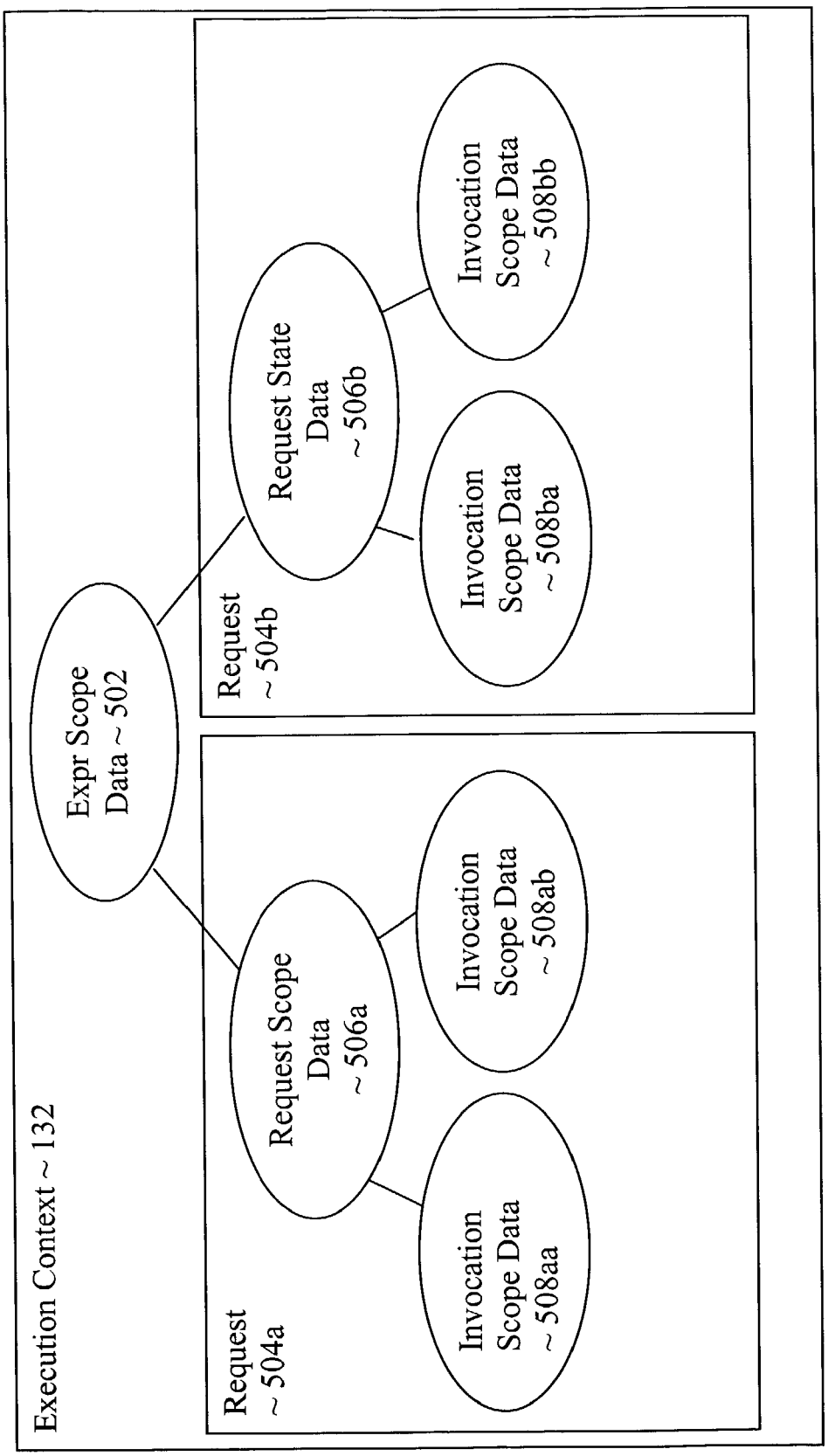
FIG. 4 illustrates an expression execution context of FIG. 1 in further detail, in accordance with one embodiment.

FIG. 4 illustrates the expression execution context 142 of the present invention in further detail, in accordance with one embodiment. As illustrated, an execution context 142 may include a set of expression scope data 502, i.e. data associated with the expression, independent of execution requests and/or invocations. An example of such data is a pre-compiled version of the expression for efficient execution.

For the embodiment, an execution context 142 may also include one or more instances of a set of request scope data 506a–506b, depending on the number of requests 134 to execute the expression 106 concurrently (not including recursive invocations of the expression 106 from the same request 134). A new instance of the request state data is created for each new execution request. The request scope data of execution context 142 is provided to advantageously facilitate aggregation of data across multiple recursive invocations of the expression 106 for the same execution request 134, while segregating data associated with different execution requests 142. An example of such data is the reply or answer to be returned for an execution request 134.

Further, each execution context 142 may include one or more instances of an invocation scope data 508aa–508ab and 508ba–508bb. A new instance of invocation scope data is created each time the expression is invoked. Accordingly, the value associated with a single local variable may be different for different invocation instances, even if the invocations are within the same request for execution. An example of such data is local variable used in an expression 106. Any expression processor may create one or more stack frames within an instance of the invocation scope data containing one or more local variables. Nested sub-expressions may access and modify the values of these variables.

For ease of understanding, only two requests and two invocations within each request are shown. However, the invention is not so limited. The invention may be practiced with any number of current execution requests of an expression, having any number of recursive invocations of itself.

Associated Methods for an Object-Oriented Implementation

As alluded to earlier, in one embodiment, execution contexts 142 are implemented in an object oriented manner, having a number of associated methods 144–146 (pre-provided). As described earlier, some 144 are associated with loading of an expression 106, while others 146 are associated with either execution of an expression 106.

FIG. 5 enumerates the more significant methods available to expression processors via execution context 142, in accordance with one embodiment. As illustrated, expression loading related methods 144 associated with loading of an expression 106 include methods 602–604 for storing and retrieving expression scope variables, such as compiled sub-expressions of expression 106.

For the embodiment, expression loading methods 144 further include methods 608–610 for storing and retrieving request scope variables such as the contents of the request that caused the expression to be invoked or the response to be returned to a requester 134.

Expression loading methods 144 further include methods 614–616 for declaring the beginning and end of local variable scopes (i.e., stack frames) and method 612 for declaring new local variables in the current local variable scope. Each local variable is accessible within the local variable scope in which it was declared and all nested local variable scopes. The number and position of local variable scopes is dictated by the semantics of the given expression language. For example, in Java a new local variable scope would be created for each "block" of code denoted by curly braces.

Expression loading methods 144 further include methods 618–620 for declaring the variables an expression uses that are defined by other expressions and determining which of the variables it defines are used by other expressions. These methods enable expression processors to perform variable dependency analysis to determine sub-expressions evaluation order and implement certain optimizations.

Further, expression loading methods 144 include load sub-expression method 630. Load sub-expression method 630 enables an expression processor to determine if, when and how many times each of its sub-expressions is to be loaded. When invoked, it loads a given sub-expression by calling the execution engine's load expression function, which determines which expression processor is responsible for loading the given expression and invokes it. The invocation of the "first" determined expression processor may in turn lead to one or more recursive invocations of the Load sub-expression method, the load expression function, and the same or other expression processors. During the load process, each invoked expression processor may store and retrieve expression state, store and retrieve request state, declare the variables it defines and uses and determine the variables used by other expressions. An expression processor may use information about the variables defined and used by its sub-expressions to determine the order in which sub-expressions should be executed or to optimize execution e.g., by eliminating computation of unused variables. An expression processor may even choose not to load certain sub-expressions based on this information.

Expression execution related methods 146 associated with execution of an expression 106 include methods 640–642 for storing and retrieving expression scope data, such as compiled sub-expressions 106.

For the embodiment, expression execution methods 146 further include methods 644–646 for storing and retrieving request scope variable values.

Expression execution methods 144 further include methods 650–652 for creating and destroying local variable scopes and methods 654–656 for storing and retrieving local variables within the current variable scope.

Further, expression execution methods 146 include execute sub-expression method 640. An expression processor may choose if, when and how many times it's sub-expressions are evaluated based on the semantics of the associated expression language. For example, a sub-expression within a loop may be evaluated multiple times, whereas a sub-expression within a conditional statement might never be evaluated. The expression processor invokes Execute sub-expression method 640 each time it needs to execute a sub-expression, passing a reference to the sub-expression. Execute sub-expression causes the given sub-expression to be executed by calling the execution engine's execute expression function, which determines which expression processor is responsible for executing the given sub-expression, invokes it and returns the result. Similarly, the invocation of the "first" determined expression processor may in turn lead to one or more recursive invocations of the Execute sub-expression method, the execute expression function, and the same or other expression processors.

The above enumerated methods may be implemented in any one of a number of techniques known in the art in implementing "put", "get" and other related methods. They may be implemented in any number of programming languages, such as C++, Java, and so forth. Such implementations are well within the ability of those ordinarily skilled in the art; accordingly will not be further described.

Execution Engine

Figure 2A:
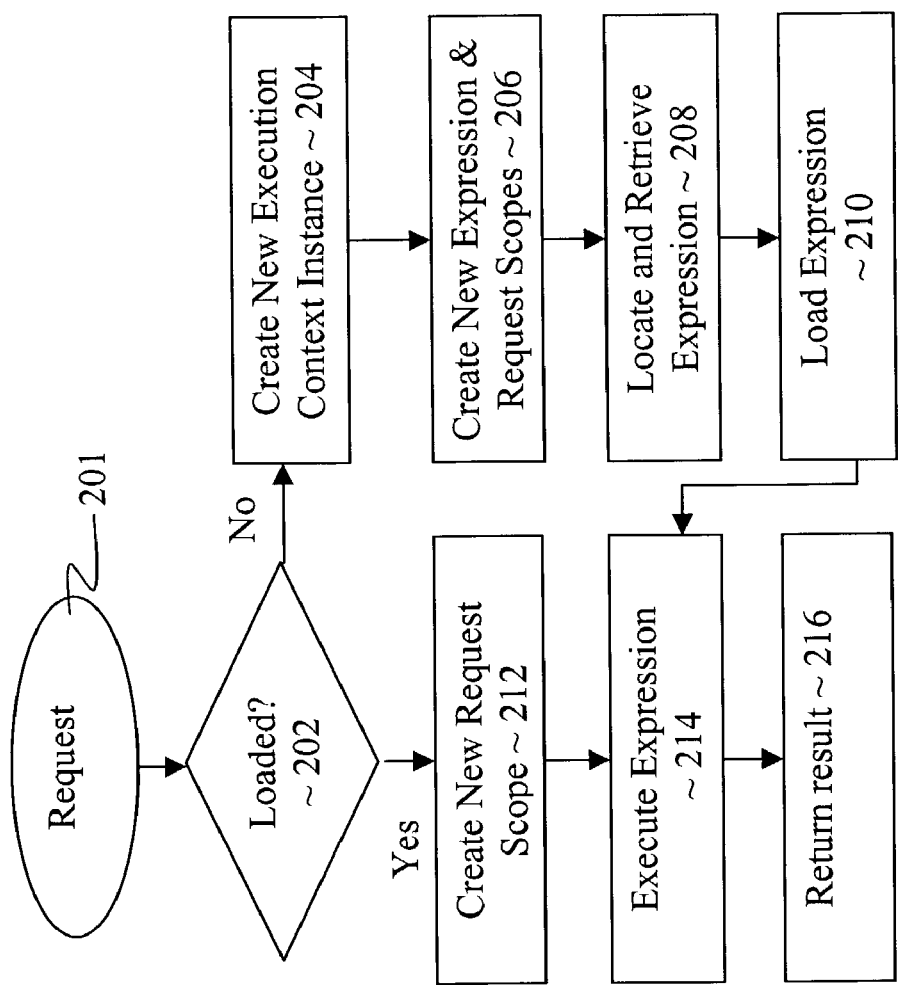
FIGS. 2a–2c illustrate the relevant operational flows of the execution engine of FIG. 1, in accordance with one embodiment.
Figure 2C:
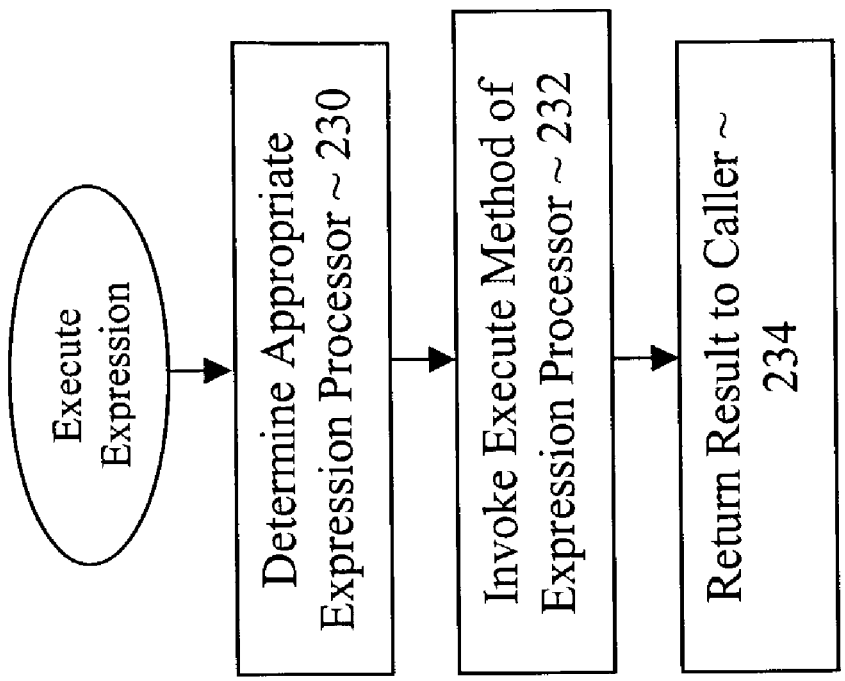
Figure 2B:
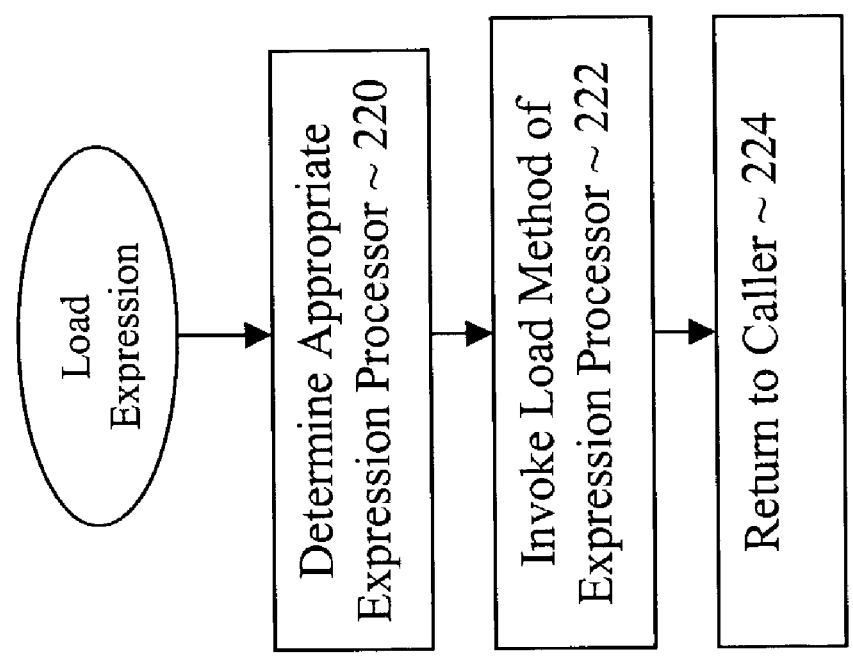

FIGS. 2a–2c illustrate the operational flows of the relevant aspects of execution engine 104, in accordance with one embodiment; more specifically, the operational flows of execution engine 104 for loading/executing expression 106, including the operational flows of the load expression function and the execute expression function. As illustrated in FIG. 2a, for the embodiment, in response to a request to execute an expression 106, execution engine 104 first determines if it has previously loaded the expression 106, block 202. If the requested expression 106 has not been previously loaded, execution engine 104 creates a new instance of execution context 142 for the requested expression 106, block 204. Next, execution engine 104 creates an expression and a request scope within the newly created instance of execution context 142, block 206.

Then, execution engine 104 locates and retrieves the requested expression 106, block 208. In one embodiment, the requested expression 106 is located based on information included with the request 134. In one embodiment, the location information is provided in the form of a uniform resource identifier (URI).

Upon locating and retrieving the requested expression 106, execution engine 104, as described earlier, causes an appropriate expression processor 105 to be invoked, which may in turn recursively cause additional ones of the expression processors 105 to be invoked, to contribute to the creation of the execution context 142, thereby "loading" the requested expression 106, block 210.

For the illustrated embodiment, execution engine 104 causes an appropriate expression processor 105 to be invoked, which may in turn recursively cause additional ones of the expression processors 105 to be invoked by invoking its load expression function. As illustrated by FIG. 2b, upon invocation, load expression function determines the "next" appropriate expression processor 105 to be invoked to contribute to the creation of the execution context 142 for the expression 106, block 220. As described earlier, in one embodiment, each expression 106 includes expression processor declarations 108 identifying the appropriate expression processors 105. In one embodiment, the declarations 108 are in the form of namespace declarations.

Upon identifying the "next" appropriate expression processor 105 to be invoked, load expression function invokes the particular expression processor 105 accordingly, block 222. In one embodiment, each expression processor 105 includes a load interface 122 having a load method 123. Load expression function invokes the expression processor 105 through load interface 122, more specifically, through load method 123, identifying for the expression processor 105 being invoked, the requested expression 106 and the corresponding execution context 142, to which it is to contribute in its creation.

As described earlier, in one embodiment, execution context 142 is implemented in an object-oriented manner having a number of load and execute related methods 144–146. The invoked execution processor 105 uses the load related methods 144 to contribute to the creation of the corresponding execution context 142.

As will be described in more detail below, upon invocation to contribute to loading an expression 106, each expression processor 105 analyzes the operators, identifiers, literal values and sub-expressions of the expression 106 that it is able to process, and initializes the corresponding execution context 142 with the appropriate expression, request and invocation scope data (using load related methods 144).

Upon encountering a sub-expression, as described earlier, expression processor 105 delegates processing (i.e., loading) back to execution engine 104 by calling the load sub-expression method, which results in the recursive invocation of load expression function, and in turn, another invocation of the same or a different expression processor 105 (blocks 220–224).

Eventually, an invoked expression processor 105 is able to contribute to the loading without having to delegate back to execution engine 104. The loading results and execution control are then successively returned to the callers in the reverse order of the recursive invocation (block 224). Eventually, the loading results and execution control are returned to the "first" invocation of load expression function. At such time, it too returns to its "caller", the "main routine" of execution engine 104, block 224.

Referring to FIG. 2a again, as described earlier, to execute an expression (after its corresponding execution context 142 has been "loaded" or after the creation of a new request scope, block 212, in the situation where the requested expression was previously loaded), execution engine 104 invokes an appropriate expression processor, which in turn may recursively invoke additional ones of expression processors 105 to cooperatively execute the requested expression 106, using the loaded execution context 142.

Similar to the load process, for the illustrated embodiment, execution engine 104 causes an appropriate one or recursively causes appropriate ones of the expression processors 105 to be invoked by invoking its execute expression function. As illustrated by FIG. 2c, upon invocation, execute expression function determines the "next" appropriate expression processor 105 to be invoked to contribute to the execution of expression 106, block 230. Again, in one embodiment, each expression 106 includes expression processor declarations 108 identifying the appropriate expression processors 105. In one embodiment, the declarations 108 are in the form of namespace declarations.

Upon identifying the "next" appropriate expression processor 105 to be invoked, execute expression function invokes the particular expression processor 105 accordingly, block 232. In one embodiment, each expression processor 105 includes an execute interface 124 having an execute method 125. Execute expression function invokes the expression processor 105 through execute interface 124, more specifically, through execute method 125, identifying for the expression processor 105 being invoked, the requested expression 106 and the corresponding execution context 142.

As described earlier, in one embodiment, execution context 142 is implemented in an object-oriented manner having a number of load and execute related methods 144–146. The invoked execution processor 105 uses the execute related methods 144 to contribute to the execution of the requested expression.

Upon encountering a sub-expression, as described earlier, expression processor 105 delegates processing (i.e., execute) back to execution engine 104 by calling the execute sub-expression method, which results in the recursive invocation of execute expression function, and in turn, another invocation of the same or a different expression processor 105 (blocks 230–232).

Eventually, an invoked expression processor 105 is able to execute a sub-expression without having to delegate back to execution engine 104. The execution results and execution control are then successively returned to the callers in the reverse order of the recursive invocation (block 234). Each expression processor 105 may use the results returned by evaluating its sub-expressions to determine the result it will return to its "caller." Eventually, the execution results and execution control are returned to the "first" invocation of execute expression function. At such time, it too returns to its "caller", the "main routine" of execution engine 104, block 234, which in turn, returns the execution results, if any, to the requester, block 216. If the request is to have "side effects" (e.g., send a message, create a file, modify a database), the "side effects" would have been caused by the successive (i.e. recursive) invocations of the expression processors 105 in accordance with the semantics of the associated expression languages.

In like manner as the earlier described methods 144–146, execute engine 104, including the load expression function, and execute expression function, may be implemented in any number of programming languages, C, C++, Java Javascript, etc., employing any number of programming techniques, object oriented or otherwise.

Expression Processor

Figure 3A:
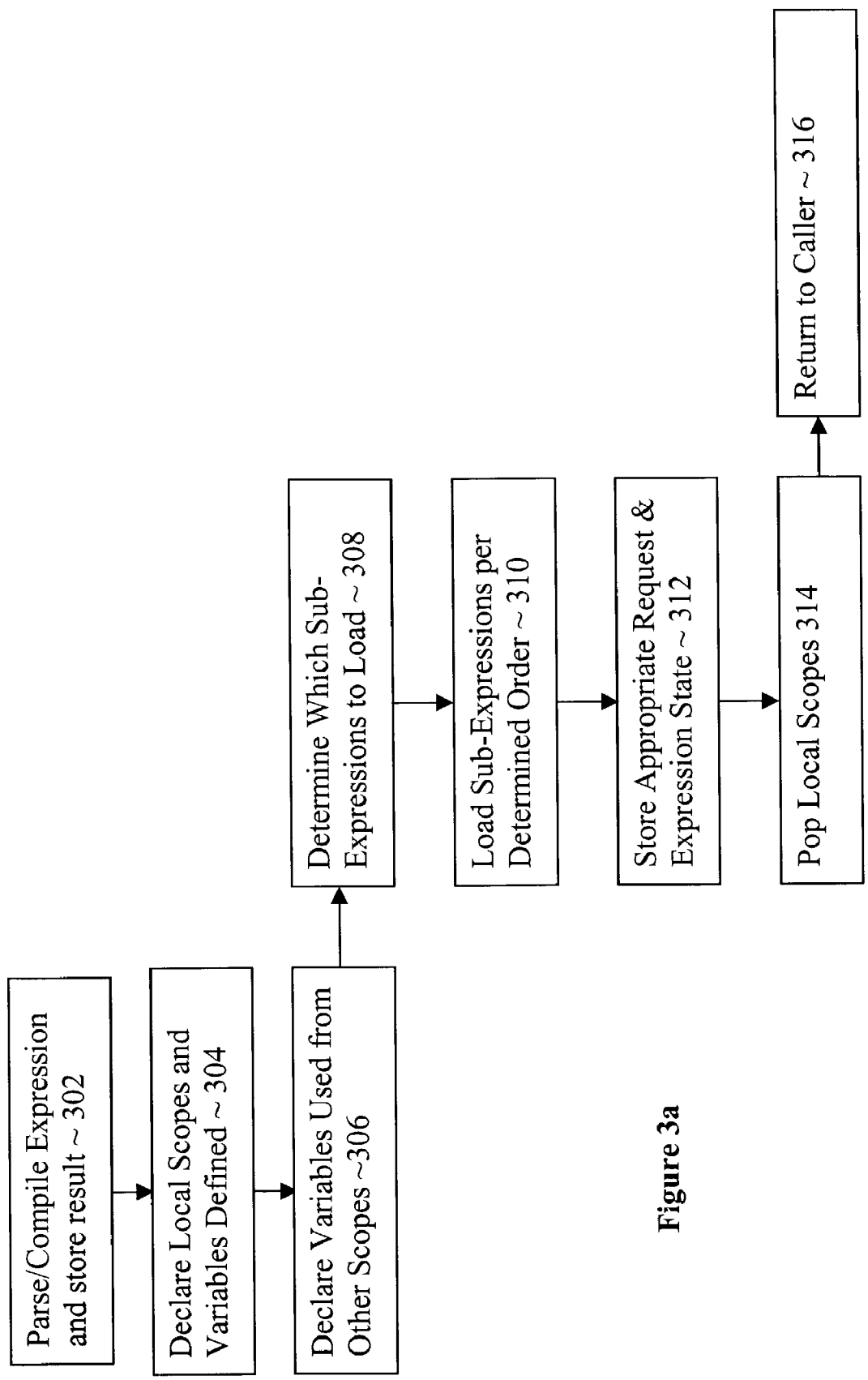
FIGS. 3a–3b illustrate the relevant operational flows of an expression processor of FIG. 1, for loading or executing an expression, in accordance with one embodiment.
Figure 3B:
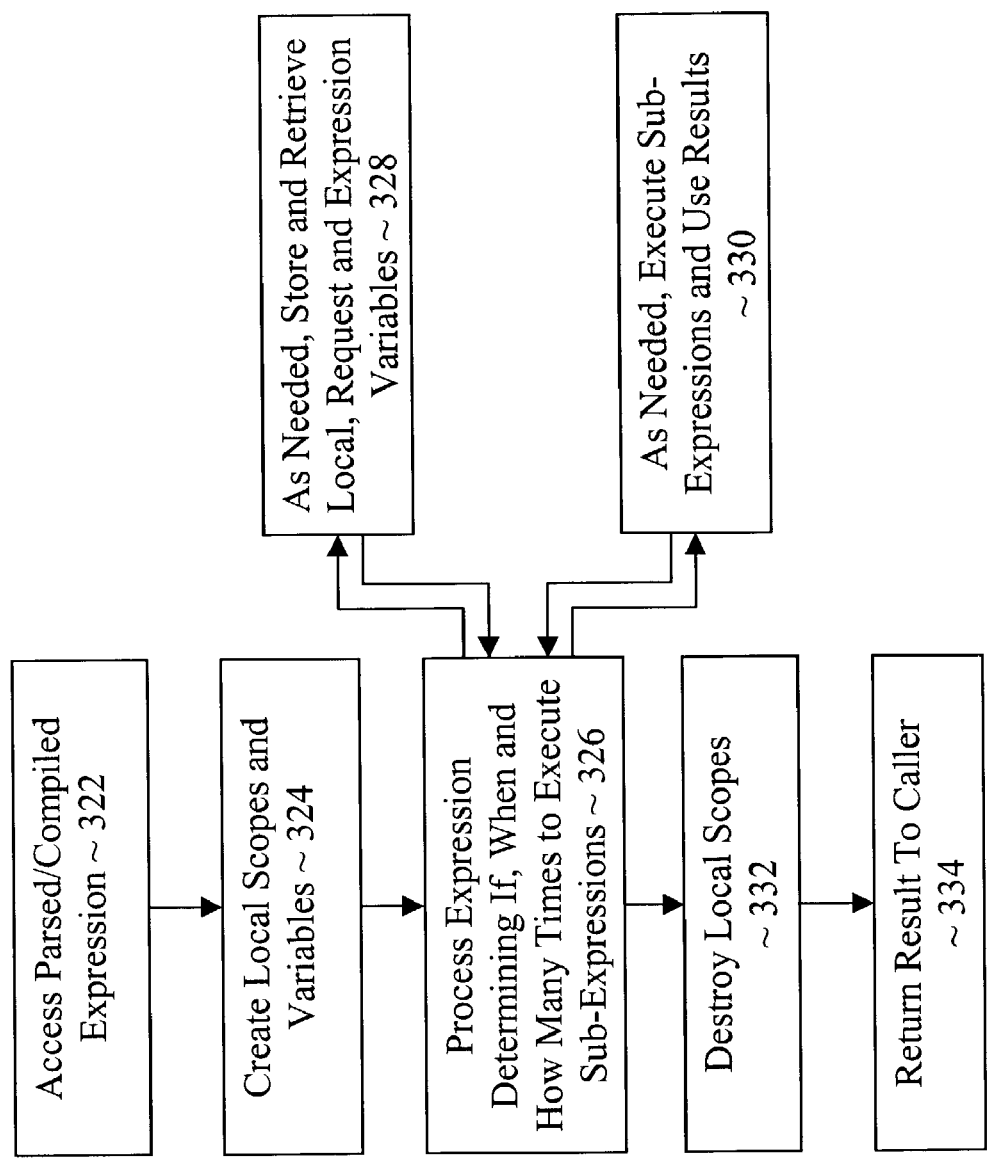

FIGS. 3a–3b illustrate typical operational flows of the relevant aspects of an expression processor 105 for processing, i.e. contributing to loading or executing, of an expression 106 respectively, in accordance with one embodiment. The exact behavior of each execution processor may be different and may depend on the semantics of the expression language it implements. Individual expression processors may omit, add or change the sequence of items in these operational flows; however, these figures illustrate common patterns expression processors may use to interact with the execution engine via the execution context methods enumerated in FIG. 5.

As illustrated in FIG. 3a, upon invocation to contribute to the loading of an expression 106, expression processor 105 may first parse, and optionally compile, the expression 106, block 302. Compilation may also include optimization of the compiled portions of the expression. Expression processor 105 may store the parsing results, and if applicable, the compilation results in the corresponding execution context 142, block 302. Further, expression processor 105 may declare the local scopes and variables defined, block 304, as well as declare variables used from other scopes, block 306.

Next, expression processor 105 may determine which sub-expressions to load and in which order based on the semantics of the associated expression language, block 308. Then, expression processor 105 may load the sub-expressions per the determined order, block 310. In one embodiment, expression processor 105 loads a sub-expression by invoking the load sub-expression method of the given execution context, which as described earlier, leads to one or more recursive invocations of the load expression function of execution engine 104, and appropriate expression processors 105 (blocks 230–234 of FIG. 2c).

Upon loading sub-expressions, expression processor 105 may store the appropriate request and expression states, block 312. Then, if expression processor 105 declared local scopes in block 304, it pops the local scopes, block 314. Finally, expression processor 105 returns execution control to its caller (i.e. load expression function of execution engine 104).

Referring now to FIG. 3b, as illustrated, upon invocation to contribute to the execution of an expression, an invoked expression processor 105 may access the parsed or compiled expression, block 322. Then, the invoked expression processor 105 may create local scopes and variables, block 324.

Then, the invoked expression processor 105 may process the expression, determining if, when and how many times to execute sub-expressions based on the semantics of the associated expression language, block 326. In one embodiment, as described earlier, the invoked expression processor 105 controls if, when, and how many times to execute sub-expressions, by invoking the execute sub-expression method of context 142, which results in the recursive invocation of one or more expression processors 105. As described earlier, the execution results are successively returned in the reverse order of the recursive invocation, and used by the callers, block 330. Where applicable, the local, request and expression variables are stored and retrieved, block 328.

Eventually, upon having executed the expression 106, the invoked execution processor 105 destroys any local scopes created in block 324, block 332, and returns the execution result to the caller, block 334.

Except for the teachings of the present invention, additional aspects of expression processors 105 are otherwise known in the art. Similar to execution engine 104, each expression processor 105 too may be implemented in any number of programming languages, C, C++, Java Javascript, etc., employing any number of programming techniques, object oriented or otherwise.

Example Computer System

Figure 6:
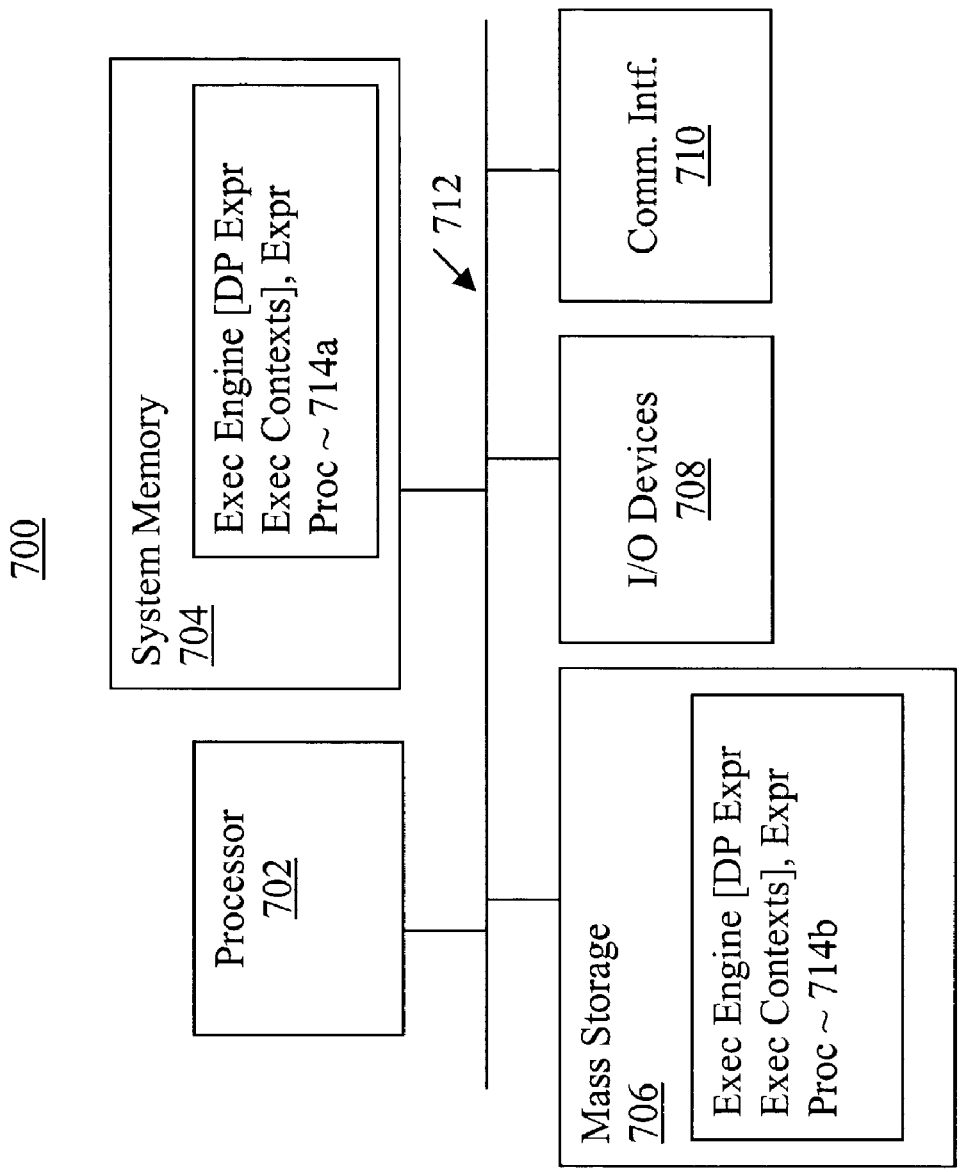
FIG. 6 illustrates a computer system suitable for use to practice the present invention, in accordance with one embodiment.

FIG. 6 illustrates a computer system suitable for use to practice the present invention, in accordance with one embodiment. As shown, computer system 700 includes one or more processors 702 and system memory 704. Additionally, computer system 700 includes mass storage devices 706 (such as diskette, hard drive, CDROM and so forth), input/output devices 708 (such as keyboard, cursor control and so forth) and communication interfaces 710 (such as network interface cards, modems and so forth). The elements are coupled to each other via system bus 712, which represents one or more buses. In the case of multiple buses, they are bridged by one or more bus bridges (not shown). Each of these elements performs its conventional functions known in the art. In particular, system memory 704 and mass storage 706 are employed to store a working copy and a permanent copy of the programming instructions implementing the execution engine, the expression processors, and so forth. The permanent copy of the programming instructions may be loaded into mass storage 706 in the factory, or in the field, through a distribution medium (not shown) or through communication interface 710 (from a distribution server (not shown)). The constitution of these elements 702–712 are known, and accordingly will not be further described.

Advantages

Thus, it can be seen from the above description, execution of expressions may be efficiently facilitated through the employment of execution engine 104 including execution contexts 142 of the present invention. Moreover, the employment of execution engine 104 with execution contexts 142 is especially instrumental in facilitating exchange of data and/or information between the loading and execution processes, as well as between different expression processors 105.

The end result is that expression processors 105 can be used together to process mixed language expressions even if expression processors 105 were independently developed with no knowledge of one another. For example, the following simple expression demonstrates that java expressions can be embedded within x-sheet expressions and vice-versa.

```
<xs:xsheet xmlns:xs="xl://crossgain.net/lang/xsheet"
    xmlns:java="xl:/crossgain.net/lang/java">
  <xs:cell name="username"> Joe Baggadonuts </xs:cell>
  <xs:output>
    <java:script>
      for (int i = 8; i > 0; i--)
      {
        emit("Counting:" + i);
        <greeting>Hello, <xs:value-of select="$username"/>!</greeting>
      }
    </java:code>
  </xs:output>
</xs:xsheet>
```

In this example, the declarative x-sheet language is taking advantage of the procedural looping constructs of java to output a message eight times. The message includes both literal XML (i.e., the <greeting> element) and an xsheet expression that returns the value of the xsheet variable (i.e., cell) "username" (i.e., <xs:value-of . . . >).

At execution time, the xsheet expression processor does not know how to process the java expression, so it uses the execution context to delegate processing to the execution engine, which in turn passes the java expression to the java expression processor. Likewise, the Java expression processor does not know how to process the XML or xsheet sub-expressions, so it uses the execution context to delegate processing to the execution engine, which passes these sub-expressions to the appropriate processors for execution. The resulting output looks like this:

Counting: 8<greeting>Hello, Joe Baggadonuts!</greeting>
Counting: 7<greeting>Hello, Joe Baggadonuts!</greeting>
Counting: 6<greeting>Hello, Joe Baggadonuts!</greeting>
Counting: 5<greeting>Hello, Joe Baggadonuts!</greeting>
Counting: 4<greeting>Hello, Joe Baggadonuts!</greeting>
Counting: 3<greeting>Hello, Joe Baggadonuts!</greeting>
Counting: 2<greeting>Hello, Joe Baggadonuts!</greeting>
Counting: 1<greeting>Hello, Joe Baggadonuts!</greeting>

In addition to allowing mixed language expressions, the current invention enables the development of new control flow operators that can be used to complement existing languages. For example, one might develop new control flow paradigms that are particularly useful in distributed systems such as the internet that are characterized by intermittent failures and non-deterministic communication latency. Below are a few examples.

a) a parallel execution operator such as

```
<x:InParallel>
    <y:CheckEmail/>
    <y:CheckNews/>
    <y:CheckVoiceMails/>
</x:InParallel>
``` where x and y and different expression processor namespace prefixes, and Check Email, Check News and Check Voice Mails are operations available in the y expression processor namespace. Instead of performing each of these operations in sequence, the InParallel operator would start executing each sub-expression simultaneously. The sub-expressions may complete and return their values in any order. The InParallel operator would complete only after all sub-expressions had completed, concatenating the results of the sub-expressions in the order specified b) "firsttocomplete" execution operator, such as

```
<x:FirsttoComplete>
    <y:CheckNews/>
    <z:CheckNews/>
</x: FirsttoComplete>
``` where x, y and z and different expression processor namespace prefixes, and Check News is an operation available in the y as well as the z expression processor namespace. The FirsttoComplete operator would start executing each sub-expression simultaneously. However, it would terminate execution after any one of the sub-expressions completed, returning only the result of the completed sub-expression.;

c) A random execution operator, such as

```
<x: Random>
    <w:CheckNews/>
    <y:CheckNews/>
    <z:CheckNews/>
</x:Random>
``` where x, y and z are different expression processor namespace prefixes, and Check News is a operation available in the w, y and z expression processor namespaces. This operator would select a random sub-expression, execute it and return it's value.; and d) A retry execution operator, such as

```
<x:Retry, timeout = "30s" times = "3">
    <y:CheckEmail/>
</x:Retry>
``` where x and y are different expression processor namespace prefixes, and Check Email, is a operation available in the y expression processor namespace. The Retry operator would attempt to execute the given sub-expression (s). If no result was returned within the timeout limit, it will retry the number of times specified.;

Conclusion and Epilogue

Thus, it can be seen from the above descriptions, a novel method and apparatus for processing and facilitating execution of expressions has been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A computing environment comprising:
   a first expression processor to load at least an expression or a sub-expression of a first expression language;
   a second expression processor to load at least an expression or a sub-expression of a second expression language that is different from the first expression language; and
   an execution engine operationally coupled to the first and second expression processors to facilitate the first and second expression processors to cooperate to load an expression of the first expression language having at least a sub-expression of the second expression language.

2. The computing environment of claim 1, wherein the execution engine is equipped to determine if an execution context of the expression has previously been created, and if not, creating the execution context in an initial state before cooperating with the first and second expression processors in loading the expression.

3. The computing environment of claim 1, wherein the execution engine is equipped to determine the first expression processor as the appropriate expression processor to invoke to start loading the expression.

4. The computing environment of claim 3, wherein the execution engine determines the first expression processor based partially or entirely on an expression processor declaration in the form of a namespace declaration including a URI.

5. The computing environment of claim 3, wherein the first expression processor includes a first load interface for the execution engine to invoke the first expression processor to load the expression of the first expression language.

6. The computing environment of claim 5, wherein the execution engine is equipped with a plurality of load related functions invocable individually or in any combination by the first expression processor to assist the first expression processor in loading the expression.

7. The computing environment of claim 6, wherein the plurality of load related functions are implemented as methods of an execution context object.

8. The computing environment of claim 6, wherein the load related functions include one or more put functions to assist the first expression processor to put values of at least one of expression scope variables and request scope variables into an execution context of the expression.

9. The computing environment of claim 6, wherein the load related functions include one or more get functions to assist the first expression processor to get values of at least one of expression scope variables, request scope variables and local variables set by other expression processors from an execution context of the expression.

10. The computing environment of claim 6, wherein the load related functions include one or more declare functions to assist the first expression processor to declare at least a selected one of a local variable defined, start of a new stack frame, end of current stack frame, and a local variable used in an execution context of the expression, but declared by another expression processor.

11. The computing environment of claim 6, wherein the load related functions include a load sub-expression function to enable the first expression processor to control if a sub-expression of the expression is to be loaded.

12. The computing environment of claim 6, wherein the load related functions include a load sub-expression function to enable the first expression processor to control when a sub-expression of the expression is to be loaded.

13. The computing environment of claim 6, wherein the load related functions include a load sub-expression function to enable the first expression processor to control how many times a sub-expression of the expression is to be loaded.

14. The computing environment of claim 1, wherein the first expression processor is equipped to analyze the expression, and storing execution related information of the expression in an execution context of the expression.

15. The computing environment of claim 1, wherein the first expression processor is equipped to compile the expression into a compiled form, and storing the compiled expression in an execution context of the expression.

16. The computing environment of claim 15, wherein the first expression processor is further equipped to optimize the compiled expression before storing the compiled expression in the execution context of the expression.

17. The computing environment of claim 16, wherein the first expression processor achieves said optimization partially or entirely by reordering or eliminating the evaluation of sub-expressions based partially or entirely on whether and how variables defined by some sub-expressions are used by other sub-expressions.

18. The computing environment of claim 1, wherein the first expression processor is designed to call the execution engine to determine an appropriate expression processor to invoke to load the sub-expression of the second expression language.

19. The computing environment of claim 1, wherein the second expression processor includes a second load interface for the execution engine to invoke the second expression processor to load the sub-expression of the second expression language.

20. The computing environment of claim 1, wherein
the computing environment further comprises a third expression processor to load at least an expression or a sub-expression of a third expression language that is different from the first and second expression languages; and
the second expression processor is designed to call the execution engine to determine an appropriate expression processor to invoke to load a sub-expression of the third expression language, the sub-expression of the second expression language further having at least another sub-expression of the third expression language.

21. The computing environment of claim 20, wherein the third expression processor includes a third load interface for the execution engine to invoke the third expression processor to load the sub-expression of the third expression language.

22. The computing environment of claim 1, wherein the second expression processor is designed to call the execution engine to determine an appropriate expression processor to invoke to load the sub-expression of the first expression language, the sub-expression of the second expression language further comprising at least another sub-expression of the first expression language.

23. A computing environment comprising:
a first expression processor to execute at least an expression or a sub-expression of a first expression language;
a second expression processor to execute at least an expression or a sub-expression of a second expression language that is different from the first expression language; and
an execution engine operationally coupled to the first and second expression processors to facilitate the first and second expression processors to cooperate to execute an expression of the first expression language having at least a sub-expression of the second expression language.

24. The computing environment of claim 23, wherein the execution engine is equipped to determine if the expression has previously been loaded, and if not, cooperate with the first and second expression processors in loading the expression.

25. The computing environment of claim 23, wherein the execution engine is equipped to determine the first expression processor as the appropriate expression processor to invoke to start execution of the expression.

26. The computing environment of claim 25, wherein the execution engine determines the first expression processor based entirely or partially on expression processor declarations in the form of namespace declarations.

27. The computing environment of claim 25, wherein the first expression processor includes a first execute interface for the execution engine to invoke the first expression processor to execute the expression.

28. The computing environment of claim 26, wherein the execution engine is equipped with a plurality of execute related functions selectively invocable individually or in any combination by the first expression processor to assist the first expression processor in executing the expression.

29. The computing environment of claim 28, wherein the plurality of execute related functions are implemented as methods of an execution context object.

30. The computing environment of claim 28, wherein the execute related functions include one or more put functions to assist the first expression processor to put values of at least one of expression scope variables, request scope variables, and local variables into an execution context of the expression.

31. The computing environment of claim 28, wherein the execution related functions include one or more get functions to assist the first expression processor to get values of at least one of expression scope variables, request scope variables and local variables set by other expression processors from an execution context of the expression.

32. The computing environment of claim 28, wherein the execute related functions include one or more functions to assist the first expression processor in at least one of declaring one or more local variables, creating a stack frame, and destroying a stack frame in an execution context of the expression, but declared by another expression processor.

33. The computing environment of claim 28, wherein the execute related functions include an execute sub-expression function to enable the first expression processor to control if a sub-expression of the expression is to be executed.

34. The computing environment of claim 28, wherein the execute related functions include an execute sub-expression function to enable the first expression processor to control when a sub-expression of the expression is to be executed.

35. The computing environment of claim 28, wherein the execute related functions include an execute sub-expression function to enable the first expression processor to control how many times a sub-expression of the expression is to be executed.

36. The computing environment of claim 23, wherein the first expression processor is equipped to use execution related information of the expression, stored in an execution context of the expression, to execute the expression.

37. The computing environment of claim 23, wherein the first expression processor is equipped to use an compiled form of the expression, stored in an execution context of the expression, to execute the expression.

38. The computing environment of claim 37, wherein the stored compiled form of the expression is an optimized compiled form of the expression.

39. The computing environment of claim 23, wherein the first expression processor is designed to call the execution engine to determine an appropriate expression processor to invoke to execute the sub-expression of the second expression language.

40. The computing environment of claim 23, wherein the second expression processor includes a second execute interface for the execution engine to invoke the second expression processor to execute the sub-expression of the second expression language.

41. The computing environment of claim 23, wherein the computing environment further comprises a third expression processor to execute at least an expression or a sub-expression of a third expression language that is different from the first and second expression languages; and the second expression processor is designed to call the execution engine to determine an appropriate expression processor to invoke to execute a sub-expression of the third expression language, the sub-expression of the second expression language further having at least another sub-expression of the third expression language.

42. The computing environment of claim 41, wherein the third expression processor includes a third execute interface for the execution engine to invoke the third expression processor to execute the sub-expression of the third expression language.

43. The computing environment of claim 23, wherein the second expression processor is designed to call the execution engine to determine an appropriate expression processor to invoke to execute the sub-expression of the first expression language, the sub-expression of the second expression language further comprising at least another sub-expression of the first expression language.

44. A method of computing comprising:
receiving by an execution engine, a request to load an expression of a first expression language having at least a sub-expression of a second expression language that is different from the first expression language; and
the execution engine invoking a first and a second expression processor of the first and second expression languages to cooperatively load the expression.

45. The method of claim 44 wherein the method further comprises
determining by the execution engine, whether an execution context of the expression has previously been created; and
if said execution context has not been previously created, creating by the execution engine, the execution context in an initial state, before invoking the first and second expression processors to cooperatively load the expression.

46. The method of claim 44, wherein at least one of said invoking of the first and second expression processors to cooperatively load the expression comprises invoking the corresponding first or second expression processor, through a load interface of the corresponding first or second expression processor.

47. The method of claim 46, wherein said invoking of the corresponding first or second expression processor through the corresponding first or second expression processor's load interface comprises invoking a load method of the load interface, referencing at least the expression.

48. The method of claim 47, wherein said invoking of the load method of the load interface of the corresponding first or second expression processor further references an execution context of the expression.

49. The method of claim 44, wherein the method further comprise the first expression processor analyzing the expression, and storing execution related information of the expression in an execution context of the expression.

50. The-method of claim 44, wherein the method further comprise the first expression processor compiling the expression, and storing the expression in a compiled form in an execution context of the expression.

51. The method of claim 50, wherein the method further comprise the first expression processor optimizing the compiled expression before storing the compiled expression in the execution context of the expression.

52. The method of claim 44, wherein the method further comprises the first expression processor invoking one or more functions of the execution engine to assist the first expression processor in contributing to the loading the expression.

53. The method of claim 44, wherein the method further comprises the first expression processor, assisted by the execution engine, performing at least a selected one of creating, reading and modifying at least one of an expression scope variable and a request scope variable in an execution context of the expression.

54. The method of claim 44, wherein the method further comprises the first expression processor, assisted by the execution engine, performing at least one of declaring local variable defined, start of a new stack frame, end of a current stack frame, local variable used in an execution context of the expression.

55. The method of claim 44, wherein the method further comprises the first expression processor, assisted by the execution engine, determining if a sub-expression is to be loaded.

56. The method of claim 44, wherein the method further comprises the first expression processor, assisted by the execution engine, determining when a sub-expression is to be loaded.

57. The method of claim 44, wherein the method further comprises the first expression processor, assisted by the execution engine, determining how many times a sub-expression is to be loaded.

58. The method of claim 44, wherein the method further comprises the first expression processor invoking the execution engine to determine an appropriate expression processor to invoke to load the sub-expression of the second expression language.

59. The method of claim 58, wherein the method further comprises
the execution engine determining the second expression processor as the appropriate expression processor to be invoked to load the sub-expression of the second expression language; and
the execution engine invoking the second expression processor to load the sub-expression of the second expression language.

60. The method of claim 59, wherein the method further comprises the second expression processor invoking the execution engine to determine an appropriate expression processor to invoke to load a sub-expression of a third expression language, the sub-expression of the second expression language further comprising at least another sub-expression of a third expression language.

61. The method of claim 60, wherein the method further comprises
the execution engine determining a third expression processor of the third expression language as the appropriate expression processor to be invoked to load the sub-expression of the third expression language; and
the execution engine invoking the third expression processor to load the sub-expression of the third expression language.

62. The method of claim 59, wherein the method further comprises the second expression processor invoking the execution engine to determine an appropriate expression processor to invoke to load a sub-expression of the first expression language, the sub-expression of the second expression language further comprising at least another sub-expression of the first expression language.

63. The method of claim 62, wherein the method further comprises
the execution engine determining the first expression processor as the appropriate expression processor to be invoked to load the sub-expression of the first expression language; and
the execution engine invoking the first expression processor to load the sub-expression of the first expression language.

64. A method of computing comprising:
receiving by an execution engine, a request to execute an expression of a first expression language having at least a sub-expression of a second expression language that is different from the first expression language; and
the execution engine invoking a first and a second expression processor of the first and second expression languages to cooperatively execute the expression.

65. The method of claim 64, wherein the method further comprises
determining by the execution engine, whether the expression has previously been loaded; and
if the expression has not been previously loaded, invoking the first and second expression processors to cooperatively load the expression before executing the expression.

66. The method of claim 64, wherein at least one of said invoking of the first and second expression processors to cooperatively execute the expression comprises invoking the corresponding first/second expression processor, through an execute interface of the first/second expression processor.

67. The method of claim 66, wherein said invoking of the corresponding first or second expression processor through the corresponding first or second expression processor's execute interface comprises invoking an execute method of the execute interface, referencing at least the expression.

68. The method of claim 67, wherein said invoking of the execute method of the execute interface of the corresponding first or second expression processor further references an execution context of the expression.

69. The method of claim 64, wherein the method further comprise the first expression processor executing the expression using execution related information of the expression stored in an execution context of the expression.

70. The method of claim 64, wherein the method further comprise the first expression processor executing the expression using a compiled form of the expression stored in an execution context of the expression.

71. The method of claim 70, wherein the method further comprise the first expression processor executing the expression using an optimizing form of the compiled expression stored in the execution context of the expression.

72. The method of claim 64, wherein the method further comprises the first expression processor invoking one or more functions of the execution engine to assist the first expression processor in contributing to the execution of the expression.

73. The method of claim 64, wherein the method further comprises the first expression processor, assisted by the execution engine, performing at least a selected one of storing and retrieving values for at least one of an expression scope variable and a request scope variable in an execution context of the expression.

74. The method of claim 64, wherein the method further comprises the first expression processor, assisted by the execution engine, performing at least one of declaring one or more local variables, creating a new stack frame, and destroying a current stack frame in an execution context of the expression.

75. The method of claim 64, wherein the method further comprises the first expression processor, assisted by the execution engine, determining if a sub-expression is to be executed.

76. The method of claim 64, wherein the method further comprises the first expression processor, assisted by the execution engine, determining when a sub-expression is to be executed.

77. The method of claim 64, wherein the method further comprises the first expression processor, assisted by the execution engine, determining how many times a sub-expression is to be loaded.

78. The method of claim 64, wherein the method further comprises the first expression processor invoking the execution engine to determine am appropriate expression processor to invoke to execute the sub-expression of the second expression language.

79. The method of claim 78, wherein the method further comprises
   the execution engine determining the second expression processor as the appropriate expression processor to be invoked to execute the sub-expression of the second expression language; and
   the execution engine invoking the second expression processor to execute the sub-expression of the second expression language.

80. The method of claim 79, wherein the method further comprises the second expression processor invoking the execution engine to determine an appropriate expression processor to invoke to execute a sub-expression of a third expression language, the sub-expression of the second expression language further comprising at least another sub-expression of a third expression language.

81. The method of claim 80, wherein the method further comprises
   the execution engine determining a third expression processor of the third expression language as the appropriate expression processor to be invoked to execute the sub-expression of the third expression language; and
   the execution engine invoking the third expression processor to execute the sub-expression of the third expression language.

82. The method of claim 79, wherein the method further comprises the second expression processor invoking the execution engine to determine an appropriate expression processor to invoke to execute a sub-expression of the first expression language, the sub-expression of the second expression language further comprising at least another sub-expression of the first expression language.

83. The method of claim 82, wherein the method further comprises
   the execution engine determining the first expression processor as the appropriate expression processor to be invoked to execute the sub-expression of the first expression language; and
   the execution engine invoking the first expression processor to execute the sub-expression of the first expression language.

* * * * *

UNITED STATES PATENT AND TRADEMARK OFFICE
CERTIFICATE OF CORRECTION

PATENT NO. : 7,043,722 B2  Page 1 of 1
APPLICATION NO. : 10/209809
DATED : May 9, 2006
INVENTOR(S) : David Bau, III It is certified that error appears in the above-identified patent and that said Letters Patent is hereby corrected as shown below:

Column 17,
Line 7, "...functions selectively invocable..." should read --...functions invocable...--.

Signed and Sealed this

Twenty-seventh Day of March, 2007

JON W. DUDAS
*Director of the United States Patent and Trademark Office*